(12) United States Patent
Taguchi et al.

(10) Patent No.: US 11,051,000 B2
(45) Date of Patent: Jun. 29, 2021

(54) METHOD FOR CALIBRATING CAMERAS WITH NON-OVERLAPPING VIEWS

(71) Applicants: Mitsubishi Electric Research Laboratories, Inc., Cambridge, MA (US); Mitsubishi Electric Corporation, Tokyo (JP)

(72) Inventors: Yuichi Taguchi, Arlington, MA (US); Esra Cansizoglu, Eskisehir (TT); Srikumar Ramalingam, Cambridge, MA (US); Yohei Miki, Tokyo (JP)

(73) Assignees: Mitsubishi Electric Research Laboratories, Inc., Cambridge, MA (US); Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/330,357

(22) Filed: Jul. 14, 2014

(65) Prior Publication Data
US 2016/0012588 A1    Jan. 14, 2016

(51) Int. Cl.
*G06T 7/20* (2017.01)
*G06T 7/70* (2017.01)
(Continued)

(52) U.S. Cl.
CPC ............. *H04N 13/257* (2018.05); *G06T 7/33* (2017.01); *G06T 7/80* (2017.01); *H04N 13/204* (2018.05);
(Continued)

(58) Field of Classification Search
CPC ........... H04N 13/0203; H04N 13/0257; H04N 17/002; H04N 13/246; H04N 5/247; G06T 7/0018; G06T 7/0028; G06T 2207/10028; G06T 7/73; G06T 2200/04; G06T 2207/30241; G06T 2207/30244; G06T 7/579; G06T 7/20; G06T 7/70; G06T 7/33; G06T 19/20; G06K 9/6215
See application file for complete search history.

(56) References Cited

U.S. PATENT DOCUMENTS 6,970,591 B1 * 11/2005 Lyons .................... G06K 9/209
345/419
8,457,357 B2    8/2013 Foote et al.
(Continued)

OTHER PUBLICATIONS

Bylow et al: ("Real-time camera tracking and 3D reconstruction using signed distance functions", in: Proc. of Robotics: Science and Systems, RSS, 2013.).*
(Continued)

*Primary Examiner* — Patrick E Demosky
(74) *Attorney, Agent, or Firm* — Gennadiy Vinokur; Hironori Tsukamoto

(57) ABSTRACT

A method calibrates one or more cameras, wherein the one or more cameras acquire images of a scene for different viewpoints, and wherein the images are non-overlapping, by first constructing a 3D model of the scene using a calibration camera that is independent of the one or more cameras, and a simultaneous localization and mapping (SLAM) procedure. 2D-to-3D correspondences between each of the images and the 3D model are determined. Then, calibration parameters of each of the one or more cameras are estimated using a 2D-to-3D registration procedure.

13 Claims, 4 Drawing Sheets

(51) Int. Cl.
 *H04N 5/247* (2006.01)
 *H04N 13/257* (2018.01)
 *H04N 17/00* (2006.01)
 *H04N 13/204* (2018.01)
 *G06T 7/33* (2017.01)
 *G06T 7/80* (2017.01)

(52) U.S. Cl.
 CPC . *H04N 17/002* (2013.01); *G06T 2207/10028* (2013.01)

(56) References Cited

U.S. PATENT DOCUMENTS

| | | | | |
|---|---|---|---|---|
| 2006/0165276 | A1* | 7/2006 | Hong | G05D 1/0253 382/153 |
| 2007/0253618 | A1* | 11/2007 | Kim | G06T 7/80 382/154 |
| 2008/0024484 | A1* | 1/2008 | Naimark | G06T 15/205 345/419 |
| 2008/0240616 | A1* | 10/2008 | Haering | G06K 9/00771 382/294 |
| 2010/0232727 | A1* | 9/2010 | Engedal | H04N 13/204 382/285 |
| 2011/0128354 | A1* | 6/2011 | Tien | G06T 7/80 348/50 |
| 2013/0155058 | A1* | 6/2013 | Golparvar-Fard | G06T 19/006 345/419 |
| 2013/0321589 | A1 | 12/2013 | Kirk et al. | |
| 2014/0293016 | A1* | 10/2014 | Benhimane | G06T 17/00 348/50 |
| 2014/0320593 | A1* | 10/2014 | Pirchheim | H04N 13/0289 348/36 |
| 2015/0086078 | A1* | 3/2015 | Sibiryakov | G06T 3/4038 382/104 |
| 2015/0154753 | A1* | 6/2015 | Schalattmann | G06T 7/0018 348/143 |
| 2015/0187140 | A1* | 7/2015 | Tseng | G06K 9/4604 345/633 |
| 2015/0243035 | A1* | 8/2015 | Narasimha | G06T 19/20 382/154 |
| 2015/0379766 | A1* | 12/2015 | Newman | G06T 7/246 356/5.01 |

OTHER PUBLICATIONS

Bylow et al: ("Real-time camera tracking and 3D reconstruction using signed distance functions", in: Proc. of Robotics: Sience and Systems, RSS, 2013.).*
Henry et al. "RGB-D mapping: Using Kinect-style depth cameras for dense 3D modeling of indoor environments"; The International Journal of Robotics Research, vol. 31, Issue 5, pp. 647-663, Feb. 10, 2012.*
Heng et al: "Infrastructure-based calibration of a multi-camera rig", 2014 IEEE International Conference on Robotics and Automation (ICRA), IEEE, May 31, 2014 (May 31, 2014), pp. 4912-4919, XP032650664, DOI: 10.1109/ICRA.2014.6907579.*
Henry et al. "RGB-D mapping: Using Kinect-style depth cameras for dense 3D modeling of indoor environments"; The International Journal of Robotics Research, vol. 31, Issue 5, pp. 647-663, Feb. 10, 2012. (Year: 2012).*
Heng et al: "Infrastructure-based calibration of a multi-camera rig", 2014 IEEE International Conference on Robotics and Automation (ICRA), IEEE, May 31, 2014 (May 31, 2014), pp. 4912-4919, XP032650664, DOI: 10.1109/ICRA.2014.6907579 (Year: 2014).*
K. Danilldis, Hand-eye calibration using dual quaternions, IJRR 1999.
R. Pflugfelder, and H. Bischof, Localization and trajectory reconstructiion in surveillance cameras with nonoverlapping views, PAMI 2010.
L. Heng, M. Burki, G. H. Lee, P. Furgale, R. Siegwart, and M. Pollefeys, Infrastructure-based calibration of a multi-camera rig, ICRA 2014.
H. Jegou, F. Perronnin, M. Douze, J. Sanchez and P. Perez and C. Schmid, Aggregating local image descriptors into compact codes; PAMI 2012.
R.M. Haralick, C.N. Lee, K. Ottenberg and M. Nolle, Review and analysis of solutions of the three point perspective pose estimation problem, IJCV 1994.
Z. Kukelova, M. Bujnak and T. Pajdla, Real-time solution to the absolute pose problem with unknown radial distortion and focal length, ICCV 2013.
N. Snavely, S. Seitz and R. Szeliski, Photo tourism: Exploring photo collections in 3D, ACM Trans, Graphics, 2006.
Heng Lionel et al: "Infrastructure-based calibration of a multi-camera rig", 2014 IEEE International Conference on Robotics and Automation (I CRA), IEEE, May 31, 2014 (May 31, 2014), pp. 4912-4919 XP032650664, DOI: 10.1109/ICRA.2014.6907579.
Torsten Sattler et al.: "Image Retrieval for Image-Based Localization Revisited", Proceedings of the British Machine Vision Conference, Jan. 1, 2012 (Jan. 1, 2012), pp. 76.1-76.12, XP055212354, DOI: 10.5244/C.26.76 ISBN: 978-1-90-172546-9 abstract p. 1-p. 4.
Ataer-Cansizoglu Esra et al: "Tracking an RGB-D Camera Using Points and Planes", 2013 IEEE International Conference on Computer Vision Workshops, IEEE Dec. 2, 2013 (Dec. 2, 2013), pp. 51-58, XP032575743, DOI: 10.1109/ICCVW.2013.14 [retrieved on Mar. 4, 2014] abstract p. 51-p. 54.
Kukelova Zuzana et al: "Real-Time Solution to the Absolute Pose Problem with Unknown Radial Distortion and Focal Length" , 2013 IEEE International Conference on Computer Vision, IEEE, Dec. 1, 2013 (Dec. 1, 2013), pp. 2816-2823, XP032573053, ISSN: 1550-5499, DOI: 10.1109/ICCV.2013.350 [retrieved on Feb. 28, 2014] abstract p. 2816-p. 2817.
Jegou H et al.: "Aggregating Local Image Descriptors into Compact Codes", IEEE Transactions on Pattern Analysis and Machine Intelligence, IEEE Computer Society, USA, vo 1 •34, No. 9 , Sep. 1, 2012 (Sep. 1, 2012), pp. 1704-1716, XP011490705, ISSN: 0162-8828, DOI: 10.1109/TPAMI.2011.235 abstract.
Ataer-Cansizoglu Esra et al.: "Calibration of Non-overlapping Cameras Using an Extema 1 SLAM System", 2014 2nd International Conference on 3D Vision, IEEE, vol. 1, Dec. 8, 2014 (Dec. 8, 2014), pp. 509-516, XP032733097, DOI: 10.1109/3DV.2014.106 [retrieved on Feb. 6, 2015] the whole document.
Peter Gemeiner et al: "Calibration Methodology for Distant Surveillance Cameras" In: "Lecture Notes in Computer Science", Jan. 1, 2015 (Jan. 1, 2015), Springer Berlin Heidelberg, Berlin, Heidelberg, XP055212386, ISSN: 0302-9743 ISBN: 978-3-54-045234-8 vol. 8927, pp. 162-173, DOI: 10.1007/978-3-319-16199-0 12, abstract.

* cited by examiner

METHOD FOR CALIBRATING CAMERAS WITH NON-OVERLAPPING VIEWS

FIELD OF THE INVENTION

The invention is generally related to calibrating cameras, and more particularly to calibrating cameras with non-overlapping views.

BACKGROUND OF THE INVENTION

Calibrating cameras where all views overlap each other is relatively simple. This is not the case when the views of the cameras are non-overlapping.

There are several known methods for calibrating multiple cameras with non-overlapping views. In one method, the multiple cameras are rigidly attached to a moving platform (e.g., a vehicle and a mobile robot) so that the cameras do not move with respect to each other. That method first determines a motion of each camera by using a simultaneous localization and mapping (SLAM) procedure for a sequence of images obtained with the camera. Then, that method matches the motions of the multiple cameras using a hand-eye calibration method, which provides the relative poses between the cameras. However, that method cannot determine all the 6 degrees-of-freedom (DOF) of the poses when specific motions or camera configurations are used. Another method additionally matches scene points constructed by the SLAM procedure among the multiple cameras to determine the 6 DOF poses. In yet another method, the sequences of images obtained with the multiple cameras are jointly used in a single SLAM procedure to construct a 3D model of the scene, which is then used to determine the relative poses between the multiple cameras. The above methods use the motion of the moving platform, and thus are not applicable to stationary cameras.

For calibrating stationary cameras, one method tracks moving objects in the scene (e.g., humans and cars) from one camera to a next camera to determine the relative poses between the cameras. That method has limited accuracy due to the assumptions on the motion model of the moving object. In another method, surveillance cameras are calibrated using global positioning system (GPS) tags on objects. That system cannot work for indoor applications. Several other methods use mirrors to acquire images of a common reference object (e.g., checkerboard) that is not originally in the field of views of the cameras.

SUMMARY OF THE INVENTION

The embodiments of the invention provide a method for calibrating one or more cameras acquiring images of a scene, wherein the images are non-overlapping. An independent simultaneous localization and mapping (SLAM) procedure is used to construct a 3D model of a 3D scene. Then, 2D-to-3D point correspondences between 2D pixel locations in the images acquired by the cameras and 3D points in the 3D model are determined. After the correspondences are obtained, a 2D-to-3D registration procedure is used to determined calibration parameters for each camera.

The method according to the embodiments partitions the non-overlapping camera calibration problem into two components. The SLAM procedure constructs the 3D model of the scene by moving a red, green, blue (RGB) camera or an RGB-depth (RGB-D) camera to different viewpoints and acquiring images. After the 3D model is constructed, the poses of the non-overlapping cameras can be determined with respect to the model. Note that the 3D model can be reconstructed using any SLAM procedure and is independent of the calibration process of the non-overlapping cameras. In contrast, in the prior methods for calibrating cameras attached on a moving platform, the cameras to be calibrated are the same as the cameras used for the SLAM procedure.

The method has fewer degeneracy problems compared to hand-eye calibration techniques. The method can calibrate a number of cameras, or a moving camera at a large number of different poses compared to what can be achieved with mirrors, calibration patterns, or by tracking moving objects. The method can be used for indoor and outdoor scenes.

DETAILED DESCRIPTION OF THE PREFERRED EMBODIMENTS

Figure 1:
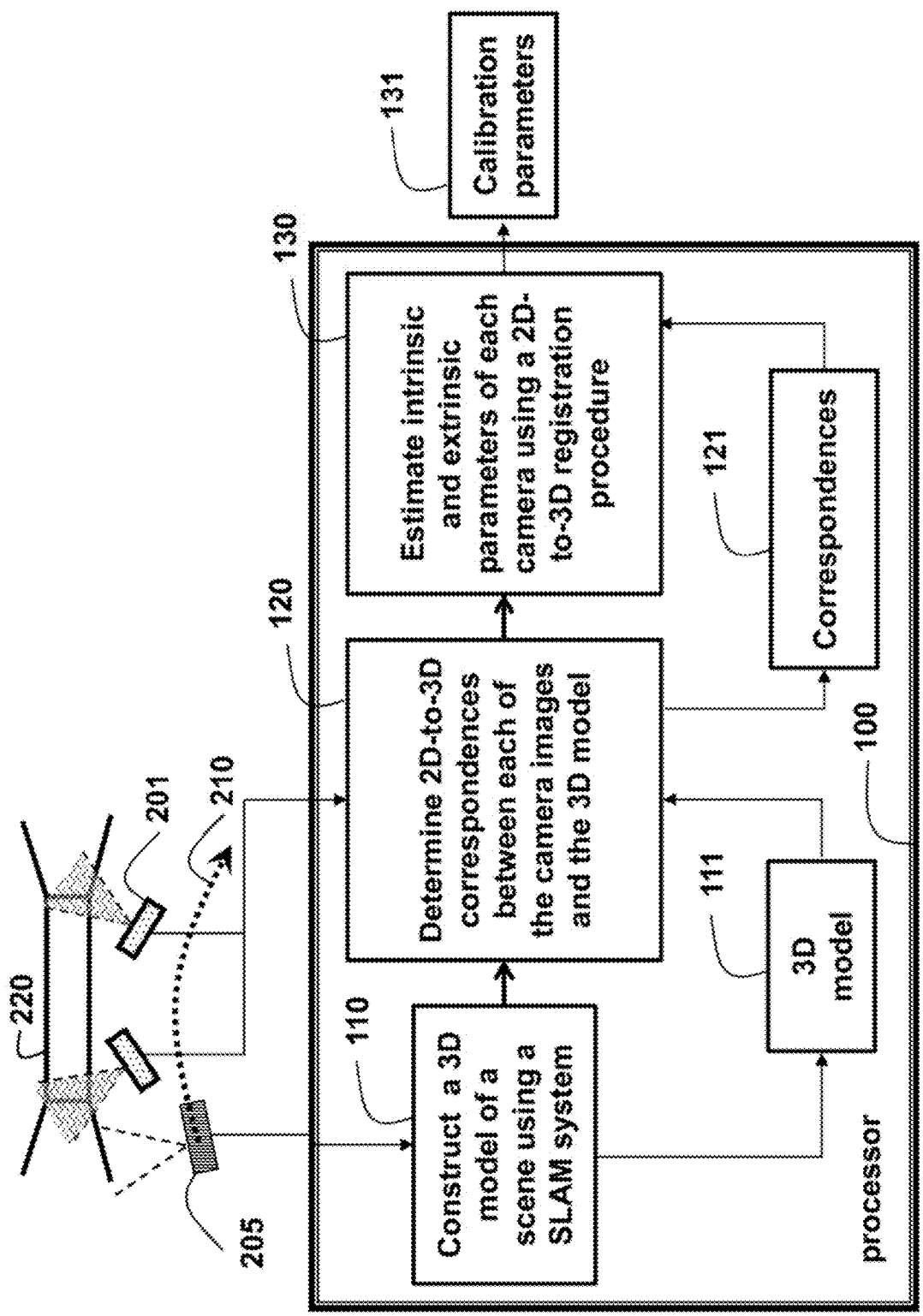
FIG. 1 is a flow diagram of a method for calibrating cameras according to embodiments of the invention.
Figure 2:
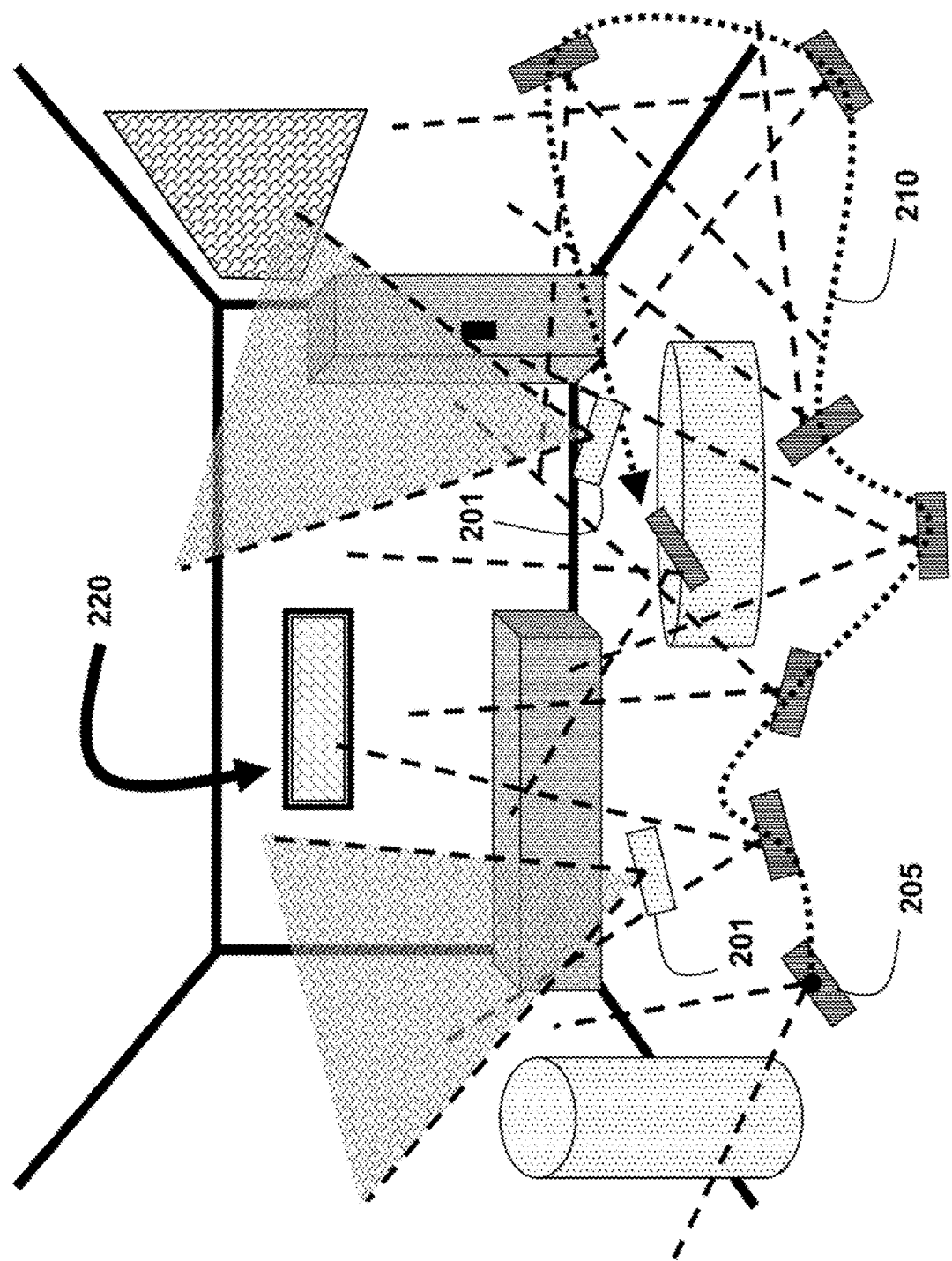
FIG. 2 is a schematic of a keyimage-based SLAM procedure according to embodiments of the invention.

FIGS. 1 and 2 show a method for calibrating one or more cameras 201 with non-overlapping views of a scene 220 according to embodiments of our invention. The method determines intrinsic and extrinsic camera calibration parameters. The intrinsic parameters include, e.g., focal length, and radial distortion parameters of the camera. The extrinsic parameters include the poses, including 3D translation and 3D rotation, of the cameras.

A three-dimensional (3D) model 111 of the scene is constructed 110 using a simultaneous localization and mapping (SLAM) procedure. A calibration camera 205 used by the SLAM procedure is independent of the one or more cameras 201 to be calibrated. Correspondences 121 between images acquired by the one or more cameras 201 and the 3D model are determined 120. Then, intrinsic and extrinsic calibration parameters 131 are determined using a 2D-to-3D registration procedure 130.

The method can be performed in a processor 100 connected to memory and input/output interfaces by buses as known in the art.

As shown in FIG. 2, for one application, the one or more non-overlapping cameras 201 are placed stationary in the scene. The 3D model of the scene is constructed by moving the calibration camera 205, arranged on a tablet computer, mobile telephone, or other similar computer devices hand-held by an operator. The calibration camera is moved 210 to different poses while acquiring the images of the scene 220 from multiple viewpoints. The system acquires about 3 images per second, enabling interactive 3D reconstruction. Feedback can be provided to the operator in real time to indicate whether the images are successfully registered or not, and determine where to image the scene next.

Model Construction

Our preferred embodiments use an RGB-D camera for constructing the 3D model. The RGB-D camera provides a sequence of RGB-D images, each of which includes an RGB image and a depth map. Examples of RGB-D cameras include Microsoft Kinect® sensors and stereo cameras.

Our SLAM procedure uses point and plane features as primitives. Planes are the dominant structure in man-made indoor or outpdoor scenes, e.g., walls, floors, ceilings, windows, furniture, pictures, etc. Using plane features improves the registration accuracy, as well as accelerates the processing speed due to the smaller number of feature matching candidates.

The system is a keyimage-based SLAM system, where images with representative poses are stored as keyimages in a map. For each RGB-D image, the system extracts point and plane features. Point features can be extracted by first using keypoint detectors and descriptors, such as the Scale-Invariant Feature Transform (SIFT) and Speeded Up Robust Features (SURF), on the RGB image, and then generating 3D points from the detected 2D keypoints via back-projection using the depth map. Plane features can be extracted using a RANdom Sample CONsensus (RANSAC)-based plane fitting procedure on the depth map. Then, the image is registered with respect to the map by using a RANSAC-based registration procedure that uses both the point and plane features. The image is added to the map when the estimated pose is sufficiently different from any existing keyimage poses. The keyimage poses, as well as point and plane features in the map, are jointly optimized using bundle adjustment asynchronously from the registration procedure.

We use a loop closing procedure to improve the accuracy of SLAM procedure when the camera returns to locations previously viewed. For this purpose, we represent an appearance of each image by using a bag-of-visual-words (BoVW) representation. As known in computer vision, a BoVW model can be applied to image classification, by treating image features as words. The bag of visual words is a vector of occurrence counts of a vocabulary of local image features. To represent an image using the BoVW model, the images are treated as documents, and "words" in the images are defined using the image features. This is usually done by the steps: feature detection, feature description, and codebook generation.

In particular for our BoVW model, we use a vector of locally aggregated descriptors (VLAD) representation on the descriptors of the point features. We determine the VLAD for all the keyimages in the map, and check the appearance similarity with a new keyimage when we add the new keyimage to the map. We also check the pose similarity between the new keyimage and the keyimages in the map. If both similarities are high for any existing keyimage, then we perform the geometric verification using the RANSAC-based registration between the keyimages. If there are a sufficient number of inliers, then we add the constraints between corresponding point/plane features appearing in the two keyimages in the bundle adjustment.

Note that the 3D map construction can also be performed using an independent RGB camera.

Camera Localization

Given the 3D model of the scene, our goal is to determine the intrinsic parameters and the pose of each camera with respect to the 3D model. The pose includes the 3D translation and 3D rotation of the camera. Because the 3D model acts as a single large-size 3D reference object, the relative poses between multiple non-overlapping cameras can be obtained after each of the cameras is localized with respect to the 3D model. Our localization works for each camera in the following two stages: determining 120 2D-to-3D point correspondences between an image acquired with the camera and the 3D model, and estimating 130 the intrinsic parameters and the camera pose by using a Perspective-n-Point (PnP) procedure. We refer to the image acquired with each camera as a query image.

Due to repetitive patterns and textureless regions in many indoor scenes, determining the point correspondences between the query image and the entire 3D model is not straightforward. Furthermore, such an all-to-all matching approach would be time-consuming. To solve these problems, we use appearance-based keyimage matching and geometric verification to determine the correspondences.

Figure 3:
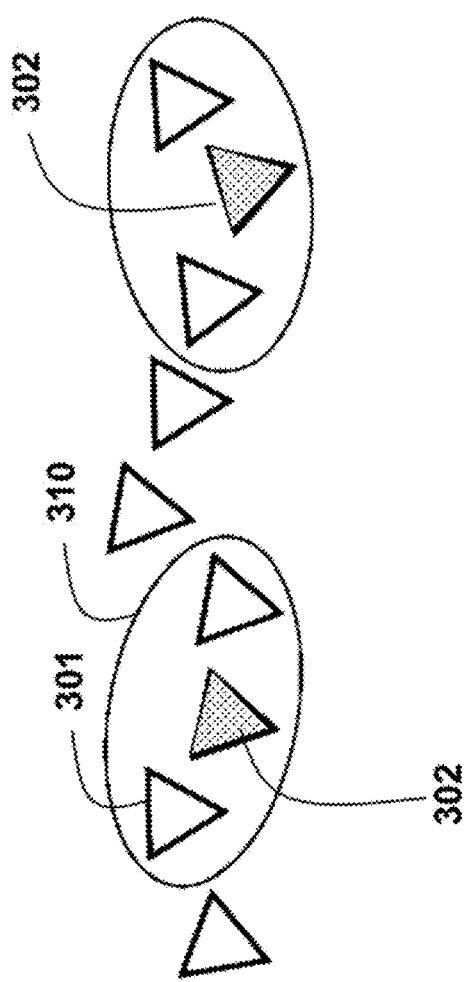
FIG. 3 is a schematic of keyimage selection according to embodiments of the invention.

FIG. 3 shows selecting candidate keyimages for point descriptor matching according to the embodiments. FIG. 3 show keyimages 301 in a map, and K closest keyimages 302 in terms of appearance. We first select K, e.g., 2, keyimages that are the closest to the query image in terms of the appearance using the VLAD descriptor. Then, for each of the K candidates, we add N−1, e.g., 2, keyimages that are closest in terms of their poses to form clusters 310 of, e.g., N=3, keyimages. The closely located keyimages can be identified by determining the similarity in the 6 DOF pose space. In practice, the similarity determined using just 3 DOF translation can be sufficient. The descriptor matching is done between the query image and each of the clusters of keyimages, which provide candidate point correspondences.

The parameter K, denoting the number of clusters, depends on the nature of the scene. For example, if the scene has R large repetitive patterns, then using K≤R can lead to an incorrect pose. The parameter N denoting the size of each cluster can be selected based on a difference between the view of the camera used in SLAM and that of the camera used for obtaining the query image. If the query image observes a large portion of the scene, then we can use a large value for N for accuracy.

In the second stage, we geometrically verify the candidate point correspondences using RANSAC for each of the clusters of keyimages. There are two different cases. If the camera intrinsic parameters are known, then we use a conventional P3P procedure that determines the 6 DOF pose. Otherwise, we use a P5Pfr method to determine the intrinsic parameters (focal length and distortion parameters) along with the 6 DOF pose. In practice, we determine only one distortion parameter, which makes the P5Pfr method over-determined. We select the best solution out of the K candidate clusters of the keyimages that produces the largest number of inliers. The initial estimates for intrinsic parameters and the pose are refined using the nonlinear least squares that minimizes the sum of reprojection errors for all the inliers.

Figure 4:
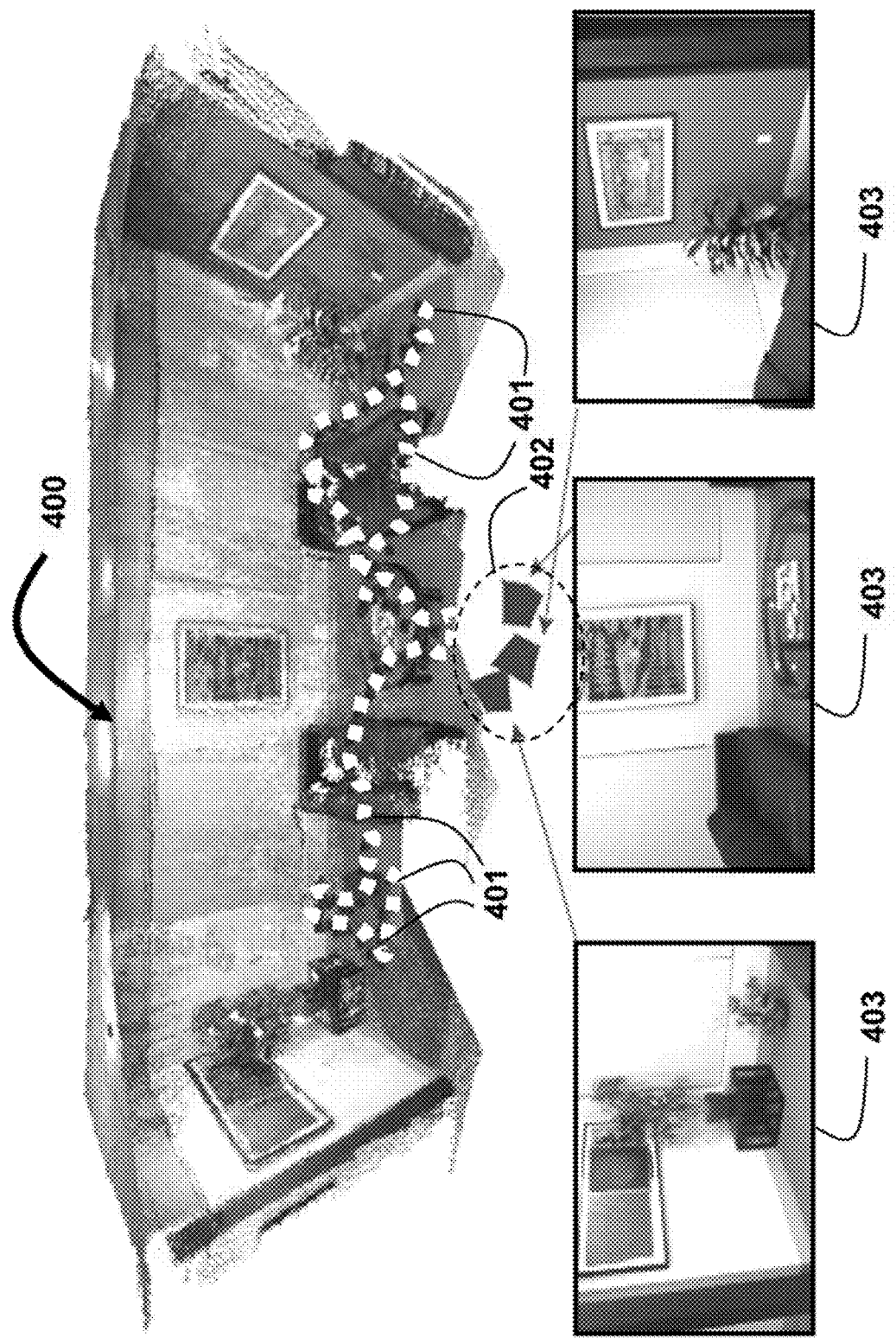
FIG. 4 is a schematic of a result of the non-overlapping camera calibration for an exemplar scene.

FIG. 4 shows a result of our non-overlapping camera calibration for an indoor scene. The 3D model 400 is depicted with the poses 401 of RGB-D keyimages, as well as those of the non-overlapping cameras 402, and corresponding images 403 of the scene. Since the non-overlapping cameras are localized in the 3D model, it is possible to display the non-overlapping cameras with the 3D model for visually understanding the camera poses as shown in FIG. 4. The 3D model also enables us to browse the non-overlapping images from geometrically correct locations.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for calibrating one or more cameras, wherein the one or more cameras acquire images of a scene for different viewpoints, and wherein the images are non-overlapping, comprising the steps of:

acquiring calibration images by moving a calibration camera;

constructing a 3D model of the scene using the calibration images acquired by the calibration camera, and using a simultaneous localization and mapping (SLAM) procedure;

determining 2D-to-3D correspondences between each of the images and the 3D model using a Perspective-n-Point (PnP) procedure; and estimating, after constructing the 3D model using the calibration camera, calibration parameters including intrinsic calibration parameters and extrinsic calibration parameters for each of the one or more cameras using the 2D-to-3D correspondences, wherein the intrinsic calibration parameters include a focal length and a radial distortion of each of the one or more cameras, wherein the extrinsic calibration parameters include a pose defining a 3D translation and a 3D rotation of each of the one or more cameras, wherein the steps are performed in a processor.

2. The method of claim 1, wherein the calibration camera is a red, green, blue and depth (RGB-D) camera.

3. The method of claim 2, wherein the constructing uses point and plane features in an RGB-D image acquired with the RGB-D camera.

4. The method of claim 3, wherein the SLAM procedure stores images with representative poses acquired with the calibration camera as keyimages in a map.

5. The method of claim 3, further comprising:
extracting the point features using a keypoint detector; and
extracting the plane features using a Random Sample Consensus (RANSAC)-based plane fitting procedure.

6. The method of claim 4, further comprising:
adding a particular image to the map when an estimated pose of the particular image is different from any poses associated with the keyimages.

7. The method of claim 4, further comprising:
optimizing the poses associated with the keyimages, the point features and the plane features in the map using joint bundle adjustment.

8. The method of claim 4, further comprising:
representing an appearance of each keyimage using a bag of visual words representation of point features.

9. The method of claim 8, further comprising:
using appearance-based keyimage matching and geometric verification to determine the correspondences.

10. The method of claim 1, wherein the one or more cameras are displayed with the 3D model using the calibration parameters.

11. The method of claim 1, wherein the 3D model and the calibration parameters are used to browse the images.

12. A non-transitory computer-readable recording medium storing thereon a program for calibrating one or more cameras, wherein the one or more cameras acquire images of a scene for different viewpoints, and wherein the images are non-overlapping, when executed by a processor, the program causes the processor to perform steps of:

acquiring calibration images by moving a calibration camera;

constructing a 3D model of the scene using the calibration images acquired by the calibration camera and using a simultaneous localization and mapping (SLAM) procedure;

determining 2D-to-3D correspondences between each of the images and the 3D model using a Perspective-n-Point (PnP) procedure; and estimating, after constructing the 3D model using the calibration camera, calibration parameters including intrinsic and extrinsic calibration parameters for each of the one or more cameras using the 2D-to-3D correspondences, wherein the intrinsic calibration parameters include a focal length and a radial distortion of each of the one or more cameras, wherein the extrinsic calibration parameters include a pose defining a 3D translation and a 3D rotation of each of the one or more cameras.

13. A camera calibration system, comprising:
one or more cameras to acquire images of a scene for different viewpoints, wherein the images are non-overlapping;

a calibrating camera to acquire calibration images by moving;

a processor connected to the one or more cameras and the calibration camera via an input/output interface; and one or more memories to store a program for calibrating the one or more cameras, wherein the program causes, when executed by the processor connected with the one or more memories via the input/output interface, the processor to perform steps of:

constructing a 3D model of the scene using the calibration images acquired by the calibration camera and using a simultaneous localization and mapping (SLAM) procedure;

determining 2D-to-3D correspondences between each of the images and the 3D model using a Perspective-n-Point (PnP) procedure; and estimating, after constructing the 3D model using the calibration camera, calibration parameters including intrinsic and extrinsic calibration parameters for each of the one or more cameras using the 2D-to-3D correspondences, wherein the intrinsic calibration parameters include a focal length and a radial distortion of each of the one or more cameras, wherein the extrinsic calibration parameters include a pose defining a 3D translation and a 3D rotation of each of the one or more cameras.

* * * * *